United States Patent Office 3,055,931
Patented Sept. 25, 1962

3,055,931
AROMATICALLY UNSATURATED ORGANIC COMPOUNDS AND PREPARATION THEREOF
Horace R. Davis, Cedar Grove, Louis A. Errede, Westfield, and Billy F. Landrum, Cedar Grove, N.J., assignors, by mesne assignments, to Minnesota Mining and Manufacturing Company, St. Paul, Minn., a corporation of Delaware
No Drawing. Filed Apr. 19, 1956, Ser. No. 579,400
18 Claims. (Cl. 260—482)

This invention relates to organic compounds containing aromatic unsaturation and to a novel and improved process for the preparation thereof. In one aspect the invention relates to a novel process for the preparation of organic compounds containing at least one aromatic nucleus and carboxylate and terminal methyl groups. Another aspect of the invention relates to new and useful oils and waxes. In still another aspect, this invention relates to a novel and improved process for the preparation of mono, poly and half esters of mono and polyquinodimethane compounds.

It is known that polymers which contain aromatically unsaturated cyclic nuclei such as poly-p-xylylene, have desirable properties which make them valuable as electrical insulators, and as protective coatings which have high heat stability, extraordinary resistance to attack by corrosive liquids and excellent permeability to common organic solvents. However, in spite of these desirable characteristics such polymers have been confined to somewhat limited application as a result of certain less desirable properties such as their non-flexibility, high degree of insolubility in organic solvents and the difficulty in molding them except at very high temperatures ranging between about 350° C. and about 450° C.

It is therefore an object of the present invention to provide new and valuable compounds having improved properties.

Another object of this invention is to provide novel organic compounds containing aromatic unsaturation which compounds are valuable as chemical intermediates.

Another object of this invention is to provide novel mono and polyesters of mono and polyquinodimethane compounds which are selectively soluble in certain organic solvents.

Another object of this invention is to provide novel mono and polyesters of mono and polyquinodimethane compounds which are valuable as lubricating oil additives.

Another object of this invention is to provide an improved method for the production of non-halogenated aromatic compounds having a terminal methyl and a carboxylate group.

Another object of this invention is to provide an improved method for the production of halogen-containing aromatic compounds having a terminal methyl and a halogenated carboxylate group.

Another object of this invention is to provide a novel process for the manufacture of half, mono and diesters of mono and polyquinodimethane compounds.

Another object is to provide a direct method for the manufacture of half, mono and diesters of mono and polyquinodimethane compounds in good yield and high selectivity.

Another object is to provide a method of manufacture for the above-mentioned compounds which is characterized by the minimum formation of by-products and the maximum utilization of starting materials.

Other objects and advantages of the present invention will become apparent to those skilled in the art from the accompanying description and disclosure.

According to this invention, a quinodimethane is reacted with an organic acid to form an addition compound as a product of the process. The preferred quinodimethanes used in accordance with this invention are the 1,4-quinodimethanes, 1,4-naphthaquinodimethanes and corresponding heterocyclic quinodimethanes containing at least one heteronitrogen atom vicinal only to carbon atoms; and nuclear substitution products of the foregoing members with atoms of the normally gaseous halogens and methyl groups. The preferred organic acids of this invention are the carboxylic acids having ionization constants greater than $4 \times 10^{-5}$ and otherwise referred to as "strong" carboxylic acids. The process of this invention is preferably conducted by interacting a mole ratio of quinodimethane to strong carboxylic acid of between about 1:2 and about 1:8 in a mutual solvent at a temperature below $-40°$ C., although reaction temperatures as high as 100° C. also may be employed, when interacting a quinodimethane with carboxylic acids having ionization constant less than $4 \times 10^{-5}$, without departing from the scope of this invention. Generally speaking the products thereby obtained are compounds which contain aromatic unsaturation and which are obtained as a result of the addition of the dissociable organic acid to the quinodimethane and are, therefore, aromatic compounds containing at least one carboxylate group.

The quinodimethanes used in accordance with the present invention contain from one to two six-membered rings, one of said rings being diunsaturated and having each of two carbon atoms of the ring bonded to a carbon atom of an aliphatic group through a double bond. The latter type ring which is common to each of the quinodimethanes, used in the process of this invention, is referred to herein as the quinoid ring. Although the two aliphatic groups which are doubly bonded to the diunsaturated or quinoid ring may be bonded to adjacent, i.e. ortho or 1,2 positioned, carbon atoms of the ring, they are preferably bonded to carbon atoms of the ring which are in the para or 1,4 position to one another. The preferred quinodimethanes of this invention are those having a symmetrically diunsaturated six-membered ring to which a methylene group is doubly bonded to each of the two para-positioned carbon atoms, such as, for example, in 1,4-quinodimethane which has the structure,

(1)

As indicated above, the term quinodimethane as used herein also includes those compounds having more than the one quinoid ring. The quinodimethanes which contain more than the one quinoid type ring are preferably those in which the additional ring is a six-membered ring having aromatic unsaturation of the benzenoid type, and which is fused to the quinoid ring such as, for example, in 1,4-naphthaquinodimethane which has the structure:

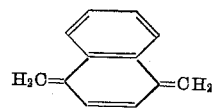
(2)

The aromatically unsaturated ring which is fused to the quinoid ring is referred to herein as the benzenoid ring.

It is to be understood that the quinodimethane starting material of this invention may be a carbocyclic compound, i.e. a compound in which each atom of the basic ring structure is a carbon atom such as in 1,4-quinodimethane and 1,4-naphthaquinodimethane; or it may be a nitrogen-containing heterocyclic compound, i.e. a compound having at least one nitrogen atom as part of the cyclic skeleton. The heterocyclic compounds are preferably those in which the nitrogen is vicinal only to carbon and includes those in which nitrogen is a constituent of the quinoid ring or the benzenoid ring.

The groups which are singly bonded to the cyclic skeleton of the quinodimethanes are referred to herein as the nuclear substituents and are any of the group consisting of hydrogen, normally gaseous halogens and halogenated or non-halogenated methyl radicals. These substituents of the dicyclic compounds may be on the quinod ring or on the aromatically unsaturated ring or on both rings. Where more than one halogen is present, they may be either the same halogens or different halogens. Of the quinodimethanes which are substituted with methyl, halomethyl or halogen groups, those having not more than substituents are preferred.

The preferred quinodimethane starting material which is reacted in accordance with the present invention is prepared by pyrolyzing an aromatic compound of the group consisting of p-xylene, 1,4-dimethyl naphthalene, corresponding heterocyclic dimethyl compounds having from one to two six-membered rings and containing at least one heteronitrogen which is vicinal only to carbon atoms, and the nuclear substitution products of the foregoing members with atoms of the normally gaseous halogens and additional methyl groups, at a temperature between 700° C. and about 1300° C. and a total pressure not higher than about 400 mm. mercury for a period of not more than one second followed by quenching of the pyrolyzed vapors to a temperature which is preferably below about −45° C., preferably in a cold liquid or on a cold surface.

Among the specific carbocyclic aromatic compounds which can be pyrolyzed to produce the quinodimethanes which are used as a reactant in accordance with the process of this invention are: p-xylene; pseudocumene; durene, isodurene; prehnitene; pentamethyl benzene; hexamethyl benzene, 1,4-dimethyl naphthalene; 1,2,3,4,6,7-hexamethyl naphthalene; 2,5-dichloro-p-xylene, 2,3,5,6-tetrachloro-p-xylene; 2,3,5,6-tetrafluoro-p-xylene; 2-chloro-3,5,6-trimethyl benzene; 6-chloro-1,4-dimethyl naphthalene; and 2,3,6,7-tetrachloro-1,4-demethyl naphthalene.

Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline; and 2,5-dimethyl-6-chloro-pyrazine.

The pyrolysis of the aforesaid dimethyl substituted aromatic compounds such as p-xylene is preferably carried out at a temperature within the range between about 950° C. and about 1300° C. For best results the aromatic compound should be present in the vapor phase at a vapor pressure not substantially higher than 150 mm. mercury. Excellent results are obtained when the vapor pressure of the aromatic compound is 10 mm. mercury or somewhat below. In all cases the total pressure employed should be below 400 mm. mercury. Within the preferred pyrolysis temperature range the residence time should be within the range of from about 0.1 to about 0.001 second, however, a shorter or longer residence time can be used without departing from the scope of this invention.

The hot vapor or quinodimethane produced by the above pyrolysis reaction is rapidly quenched in a liquid such as hexane, which is maintained at a relatively low temperature, preferably below −45° C. The temperature at which the hot vapors of quinodimethane quenched depends on whether or not the quinodimethane is to be stored over an extended period of time or whether the quinodimethane is to be used immediately in accordance with the process of this invention. This is an important consideration since it has been found that the quinodimethanes form polymeric products at about room temperature, and in fact, they polymerize rapidly at temperatures above about −45° C. Thus when it is desired to store the quinodimethane in stable form until it is to be interacted with the inorganic coreactants of the present invention, the hot vapor obtained by the above pyrolysis reaction is quickly quenched and dissolved in a cold liquid maintained at a temperature below about −45° C. and preferably at about −80° C.

The liquid used for quenching and storing of the quinodimethane may be of any composition which remains liquid at the necessary temperature range and which has a relatively low partial pressure at about −45° C. consistent with the upper total pressure limit of 400 mm. mercury pressure and preferably low enough to permit operation below 10 mm. mercury. The liquid should also be substantially non-reactive with the quinodimethanes formed although liquids which do not form compounds which are detrimental to the reaction and do not consume significant amounts of the reactants, may be used. Among the specific liquids which may be used are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloroethyl benzene, o-fluoro toluene and 1,1-dichloro-ethane; a carbonyl compound of low freezing point such as acetone, methyl ethyl ketone and methyl isobutyl ketone; an ether of low freezing point, such as diethyl ether, ethyl n-propyl ether and tetrahydrofurane; an alcohol of low freezing point, such as methanol, ethanol and isopropyl alcohol; and other normally liquid compounds of low freezing point, such as carbon disulfide. It is to be understood that any mixture of the aforesaid liquids may be used as the quenching medium, as desider. If desired, a liquid of low freezing point may be obtained by the blending of two or more compounds of higher freezing point. For example, a mixture of carbon tetrachloride and chloroform may be used.

A more detailed description concerning the preparation of stable concentrated solutions of the quinodimethane starting material used in accordance with the present invention can be found in our prior copending application, Serial No. 386,106, filed October 14, 1953, now U.S. Patent No. 2,777,005.

The dissociable organic compounds which are used in accordance with this invention are any of the organic acids, for example, the carboxylic acids. The preferred organic acids are the "strong" carboxylic acids, that is, those acids having ionization constants greater than $4 \times 10^{-5}$.

Examples of suitable carboxylic acids which are employed in the addition reaction of this invention are the acyclic, saturated and unsaturated, mono and polycarboxylic acids, such as, for example, formic acid, acetic acid, propionic acid, butyric acid, vinyl acetic acid, elaidic acid, oleic acid, acrylic acid, oxalic acid, malonic acid, succinic acid, adipic acid, crotonic acid, citraconic acid, maleic acid, angelic acid, fumaric acid, brassylic acid, geranic acid, linoleic acid, linolenic acid, tetrolic acid, propiolic acid, homologs and isomers thereof; the alicyclic saturated and unsaturated mono and polycarboxylic acids such as, for example, cyclopropanedicarboxylic acid, cyclobutanoic acid, cyclohexanoic acid, cyclohexane dicarboxylic acid, cyclobutenoic acid, homologs and isomers thereof; and the aromatic mono and polycarboxylic acids such as, for example, benzoic acid, naphthalic acid, toluic acids, phenyl acetic acid, phenyl methyl acetic acid, atropic acid, phenylpropiolic acid, cinnamic acid, phthalic acid, diphenyl-o,o'-dicarboxylic acid, hemimellitic acid, mellophanic acid, piperonylic acid, homologs and isomers thereof.

The carboxylic acids may be substituted with one or more of the same or different electronegative substituents such as fluorine atom, chlorine atom, bromine atom, iodine atom, sulfur atom, ester group, hydroxy group, nitro group, nitroso group, amide group, amine group, carbonyl group, cyanide group, etc.

Generally an electronegative substituent on the α-carbon atom of an aliphatic or an alicyclic hydrocarbon carboxylic acid markedly increases the acidity and therefore raises the ionization constant (K) of the hydrocarbon acid. For example, acetic acid has a K value of $1.75 \times 10^{-5}$ but monochloroacetic acid has a K value of $1.4 \times 10^{-3}$ and dichloroacetic acid has a K value of $5 \times 10^{-2}$. Examples of substituted aliphatic and alicyclic mono and poly carboxylic acids are pyruvic acid, tartaric acid, β-mercapto-propionic acid, aspartic acid, citric acid, trichloroacetic acid, α-bromobutyric acid, dichlorosuccinic acid, trifluoroacetic acid, oxaminic acid, oxaluric acid, 3,5,6-trichloro-octafluorohexanoic acid, 3,5,7,9,10-pentachloro-tetradecafluorodecanoic acid, dibromomaleic acid, α-nitropentanoic acid, α,α-dinitropropionic acid, cyanoacetic acid, tetrahydrosalicylic acid, α-chloroacrylic acid, hydroxycrotonic acid, dicyanoacetic acid, 2-chlorocyclopropanedicarboxylic acid, 3,3-dibromocyclopentanoic acid, 3-hydroxycyclohexanedicarboxylic acid, etc. Substitution of the β-carbon of a hydrocarbon carboxylic acid with an electronegative substituent has a lesser acidifying or polarizing effect than substitution of the α-carbon and the effect diminishes as the position of the substituted carbon regresses with respect to the carboxyl group.

The introduction of electronegative substituents in the para or ortho position of aromatic hydrocarbon mono and polycarboxylic acids increases the acidity and therefore the K value of the aromatic hydrocarbon acid. For example, the ionization constant of β-phenylpropionic acid is $2.19 \times 10^{-5}$ but the K value of p-nitro-β-phenyl-propionic acid is $3.36 \times 10^{-5}$. Examples of electronegatively substituted aromatic mono and polycarboxylic acids are aminobenzoic acid, gallic acid, anisic acid, hydroxybenzoic acid, nitrobenzoic acid, phthalamidic acid, anthranilic acid, o-carboxyphenylacetonitrile, 6,6'-dinitrodiphenic acid, acetylsalicylic acid, β-3-acenaphthoyl-propionic acid, syringic acid, trifluoromethylbenzoic acid, S-benzyl-dl-cysteine, o-cumaric acid, o-nitrocinnamic acid, thyroxine, pulvinic acid, piperonylic acid, lecanoric acid, caffeic acid, piperic acid, tropic acid, and homologs and isomers of these compounds.

Other organic acids which are utilized in the addition reaction of this invention are the thioacids otherwise designated as the thiocarboxylic (RCOSH) and carbodithioic (RCSSH) acids, such as thioacetic acid, thiobenzoic acid, thiopropionic acid, dithioacetic acid, dithiocarbamic acid, dithiosalicylic acid, etc., and polybasic oxy-acids of trivalent and pentavalent phosphorous and sulfur atoms such as the sulfonic and phosphonic acids.

The preferred organic acids which are used in accordance with this invention are the mono and polycarboxylic acids having ionization constants greater than $4 \times 10^{-5}$ which acids may or may not contain substitution. A few specific examples of preferred acids include acrylic acid, barbituric acid, benzoic acid, bromoacetic acid, bromophenylacetic acid, chloropropionic acid, trifluoroacetic acid, chlorocinnamic acid, cis-cinnamic acid, citraconic acid, citric acid, cyclobutane-1,1-dicarboxylic acid, cyclopentane-1,1-dicarboxylic acid, dichloroacetic acid, diethyl-maloric acid, dimethoxy-phenylacetic acid, 2,4-dinitrophenylacetic acid, diphenylacetic acid, ethyl-n-propylmaloric acid, formic acid, fumaric acid, gallic acid, hippuric acid, m-hydroxybenzoic acid, iodobenzoic acid, maleic acid, 2-methyl-6-nitrobenzoic acid, mucic acid, naphthoic acids, nitrobenzoic acids, oxalic acid, o-phenyloxybenzoic acid, phthalic acid, picric acid, salicylic acid, succinic acid, tartaric acid, tartronic acid, m-toluic acid, trichloroacetic acid, vinylacetic acid, chlorodifluoroacetic acid, 3,4-dichloropentafluorobutyric acid, 3,5,6-trichloro-octafluorohexanoic acid, 3,5,7,8-tetrachloroundecafluoro-octanoic acid, 2-chlorotrifluorosuccinic acid, 2,4-dichloro-hexafluoroadipic acid, 2,4,6-trichlorononafluorosuberic acid, etc.

The last mentioned perchlorofluoro acids in the preceding paragraph are prepared according to the methods set forth in the copending application of David B. Brandon, Serial No. 452,704, now U.S. Patent No. 2,950,300, and copending applications of William S. Barnhart and Robert H. Wade, Serial Nos. 452,703, now U.S. Patent No. 2,806,865, and 452,705, now U.S. Patent No. 2,806,-866; all filed August 27, 1954. According to these applications the perchlorofluorocarboxylic acids named above are prepared by oxidizing a perhalogenated aliphatic olefin in the presence of permanganate solution, preferably an aqueous permanganate solution, at a temperature between about 120° C. and about 10° C., preferably at about 0° C.; or by treating a fluorine-containing perhalogenated telomer with fuming sulfuric acid at a temperature between about 125° C. and about 300° C. for a period ranging between about 5 and about 50 hours.

In carrying out the process of this invention the quinodimethane and the organic acid or co-reactant are employed in at least equimolar amounts in order to obtain the optimum yield of the 1:1 addition product. Although the mole ratio of quinodimethane to acid co-reactant may vary between about 1:1 and about 1:15, it is preferred to employ the starting materials in a mole ratio of between about 1:2 and about 1:8 of quinodimethane to acid co-reactant.

The presently described addition process may be carried out in the presence or absence of a catalyst. If a catalyst is used in the presently described process, the preferred types include the strong inorganic acids such as, for example, hydrochloric acid, sulfuric acid, phosphoric acid, hydrofluoric acid, etc. The inorganic catalysts are used in amounts varying between about 0.001 and about 0.1 mole per mole of quinodimethane to promote the addition reaction between the quinodimethane and the organic acid co-reactant.

Although the process of the present invention may be carried out at a temperature as high as 100° C., it is usually carried out at a temperature below 30° C., and preferably at a temperature below −40° C. which temperature may be as low as −120° C. The preferred reaction temperatures vary between about −40° C. and about −100° C. However, the reaction can be run at a mixed temperature without departing from the scope of this invention. In this case the quinodimethane solution at a temperature at about −80° C. is quickly added to a hot or refluxing solution of the organic acid and an intermediate temperature of reaction is reached. This course of operation is usually followed when an organic acid having K values significantly less than $4 \times 10^{-5}$ is employed as a coreactant.

When the quinodimethane solution and the organic acid are reacted at a temperature above about −40° C., it is important that the quinodimethane be brought to such a temperature while in contact with at least an equimolar amount of the organic co-reactant in order to keep the competing homopolymerization of the quinodimethane from dominating the reaction. Thus, for example, when 1,4-xylene is pyrolyzed under the conditions set forth above, the hot vapors are quenched quickly in a cold liquid to a temperature between about −40° C. and about 30° C. to produce 1,4-quinodimethane, the quenching step and reaction with at least one equimolar amount of organic acid are carried out substantially simultaneously. Although the reaction may be effected adiabatically, isothermally controlled conditions are preferred.

The reactions of this invention are run for a period not exceeding 96 hours and usually not in excess of 24 hours. Although some of the addition product begins to form immediately, a substantial quantity of product is not collected before about 0.5 hour has expired. Thus, the preferred reaction period varies between about 0.5 and about 24 hours.

The addition reactions of the present invention are accomplished by contacting the quinodimethane and the organic acid co-reactant in a suitable liquid medium within the aforesaid temperature range. The liquid medium is preferably provided by a solvent which functions as a mutual solvent for both the quinodimethane and the organic acid in the reaction. The quinodimethane constituent is always reacted in solution, the solvent being any one of the aforesaid liquids of low freezing point are also suitable as solvents for the dissociable organic acid constituent, however, the preferred organic acid solvents are the non-polar type such as, for example, benzene, xylene, hexane, cyclo-hexane, etc., and water. Thus, it is evident to those skilled in the art that the reaction may be carried out in a mixed solvent or single solvent reaction medium. It is also to be understood, without departing from the scope of this invention, that the acid, if liquid at reaction temperatures, may be interacted in an undiluted state with the quinodimethane solution and may additionally serve as the solvent or quenching liquid for the quinodimethane gas.

The addition reaction of this invention is preferably executed in the liquid phase since the vapor phase reaction is accompanied by various undesirable side reactions which deleteriously effect the yield of the desired addition product.

In carrying out the process of this invention, it is important that the initial concentration of the organic acid coreactant be relatively high as compared with the concentration of the quinodimethane if a 1:1 addition product is the desired product of the reaction. This is particularly important when a reaction temperature between about −40° C. and 30° C. or above is employed. It is therefore preferred to add the quinodimethane gradually to the organic acid co-reactant with agitation so as to maintain good contact with an excess of the organic acid during most of the reaction period and so that the 1:1 addition product may be produced in the highest yield and selectivity. If, however, a telomer is the desired product of the addition reaction the order of addition may be reversed. This reversed order of addition permits a certain amount of homopolymerization to occur before the dissociable organic acid co-reactant terminates the chain.

Although these reactions may be run under pressures up to 1,000 pounds per square inch gauge, it is preferred in most cases to conduct the addition at atmospheric pressure. Application of pressure may be beneficial in the addition reaction wherein a relatively unreactive dissociable organic acid is added to the quinodimethane solution. In this case, the organic acid may be pressured into the reactor under about 300 pounds per square inch gauge or higher.

In a preferred embodiment of this invention, a solution of 1,4-quinodimethane, for example, which is chilled to a temperature between about −120° C. and about −40° C. is added to a solution containing an organic acid having an ionization constant value greater than $4 \times 10^{-5}$, the co-reactant being present in a molar concentration which is at least twice the number of moles of quinodimethane which is to be added. The products of the reaction begin to form immediately and the reaction is allowed to run to completion during which time the mixture may be allowed to warm to room temperature or may be controlled isothermally at between about −120° C. and about −40° C., as desired. Upon completion of the reaction, which is generally accomplished within 24 hours, the excess organic acid co-reactant, if sufficiently volatile, is conveniently removed by bubbling an inert gas such as nitrogen, through the system, or in the case of less volatile organic acid co-reactants, the reaction mixture is concentrated by removing the solvent and any unreacted material by evaporation. The products are purified by conventional techniques such as crystallization or fractional distillation depending upon the physical nature of the addition products.

The products produced in accordance with the present invention are addition products of the quinodimethane and the organic acid co-reactant and result from the addition of the dissociable organic acid moieties to the doubly bonded methylene groups attached to the quinoid ring or rings of the quinodimethane compound, thereby causing rearrangement of the di-unsaturated quinoid ring to an aromatically unsaturated ring.

The products of this invention correspond to the following general formula $$R[CX_2(CY_2-Q-CY_2)_nH]_m \tag{3}$$

wherein R is substantially the same as the organic radical of the corresponding organic acid; X is a sulfur or an oxygen atom; Y is a hydrogen or halogen atom or a methyl group, however, it is to be understood that the two Y units bonded to the carbon atom may be the same or different substituents and that no more than one Y unit of each $CY_2$ unit is a substituent other than hydrogen; Q is an aromatically unsaturated nucleus of the benzene, naphthalene or heterocyclic nitrogen type which contains not more than two substituents selected from the group consisting of fluorine, chlorine and bromine atoms and methyl and halomethyl groups; $n$ is an integer from 1 to 100 and $m$ is an integer from 1 to 2.

The preferred addition products of this invention contain no more than 2 xylylene or polyxylylene radicals, each of which are bonded to a carboxylate radical through the carbon atom of one of the methylene groups of each xylylene or polyxylylene radical and each having terminal hydrogen atoms. The xylylene radical of the addition product contains such substitution as is present in the quinodimethane starting material so that if 1,4-quinodimethane were reacted with an organic acid the xylylene radical of the resulting addition product would be a 1,4-xylylene radical

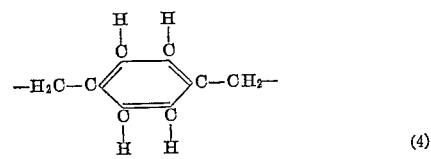

(4)

whereas if 2-chloro-1,4-quinodimethane were reacted with an organic acid the xylylene radical of the resulting addition product would be a 2-chloro-1,4-xylylene radical

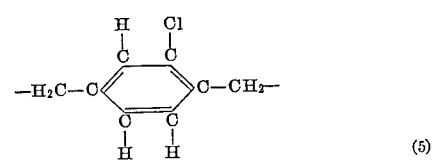

(5)

if 1,4-naphthaquinodimethane were reacted with an organic acid the xylylene radical of the resulting addition product would be a 1,4-naphthaxylylene radical

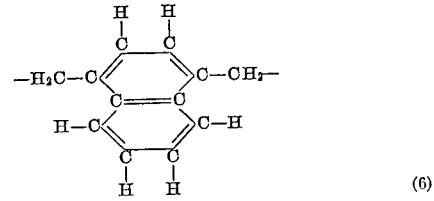

(6)

and if a heterocyclic quinodimethane containing a heteronitrogen atom vicinal to two carbon atoms were reacted with an organic acid the xylylene radical of the resulting addition product would also contain the heteronitrogen atom in the same position as in the quinodimethane starting material. In other words, the quinoid ring of the quinodimethane in the course of addition becomes rearranged to an aromatic ring containing the same constituents as the original ring.

The carboxylate radical of the addition product contains not more than two substituted sulfur atoms as in the carboxylate dioxy radical (RCOO—), the thiocarboxylate radical (RCOS—) and the carbodithioate radical (RCSS—) and contains substantially the same substituents as are present in the organic acid from which it is derived.

The preferred products of this invention correspond to the formula $$R[CX_2(-CH_2-Q-CH_2)_nH]_m \quad (7)$$

wherein R, X and $m$ are the same as described above; $n$ is an integer from 1 to 25 and Q is an aromatically unsaturated nucleus to which the methylene groups in the above Formula (#7) are attached in the 1 and 4 position.

The following equations are offered as a better understanding of this invention and are not to be construed as unnecessarily limiting thereto as they illustrate the addition reactions of 1,4-quinodimethane with organic carboxylic dioxy acids and the reactions represented by the equations can be carried out in the specific manner described in the examples which follow.

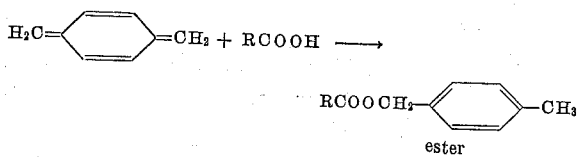

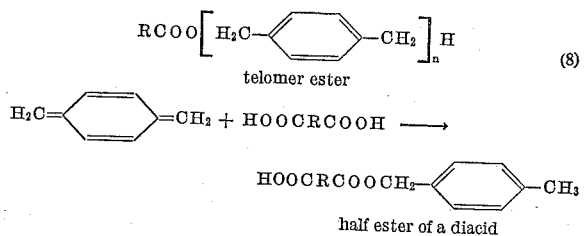

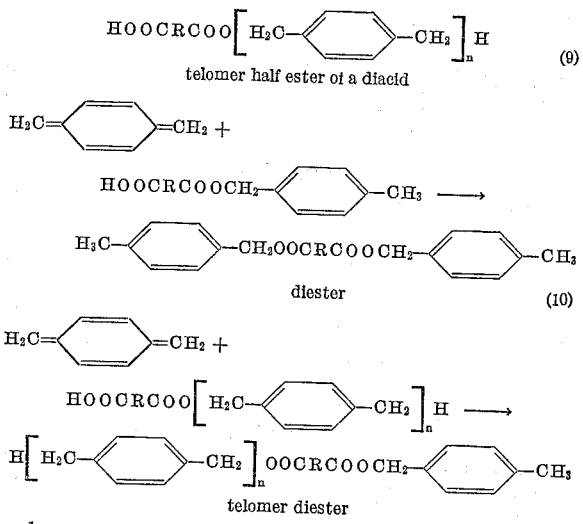

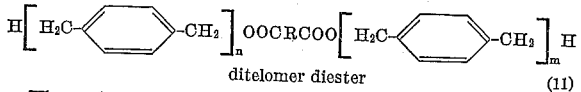

Thus, the general reaction of the present invention may be represented as follows wherein 1,4-quinodimethanes are used as a typical example of the various quinodimethanes which may be employed as starting materials;

A is one moiety of the dissociable organic acid; and $n$ is an integer from 1 to 100 or higher.

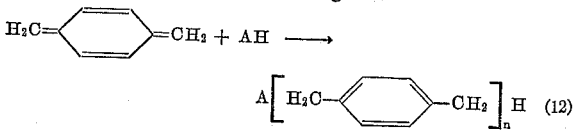

Particularly preferred of the addition products produced in accordance with this invention are the carboxylic dioxy esters, diesters and half esters of substituted or non-substituted 1,4-quinodimethane compounds which comprise no more than 2 xylylene radicals bonded to a carboxylate radical through the carbon atom of one of the methylene groups of the xylylene radical and having terminal hydrogen atoms.

The particularly preferred products correspond to the formula

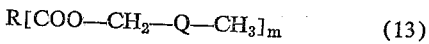

wherein R, Q and $m$ are the same as shown above.

The following examples are offered as a better understanding of the present invention and are not to be construed as unnecessarily limiting thereto.

*Example 1*

This example illustrates the preparation of 1,4-quinodimethane.

1.4-xylene vapor at 5 mm. mercury pressure and preheated to 700° C. was passed through a glass pyrolysis tube of 2.5 cm. diameter and 30 cm. in length at such a velocity that the average contact time was 0.05 second and heated to a pyrolysis temperature of 1000° C. The pyrolyzed vapors were passed directly to the top of a six-liter, 3-necked glass flask which contained 3.8 liters of a chloroform-carbon tetrachloride mixture (1:1 by volume) and were then cooled in a bath of solid carbon dioxide-acetone to a temperature of −80° C. The chloroform-carbon tetrachloride mixture was continuously agitated to prevent localized heating. The liquid remained transparent for about two hours until the saturation limit was reached and then became opaque as a solid 1,4-xylene and solid 1,4-quinodimethane precipitated out. The flask was disconnected from the train at the end of the run and the solid precipitate containing 1,4-xylene was removed by filtration.

To prove that the mother liquor contained 1,4-quinodimethane, a portion of it was added at −80° C. to a solution of chloroform-carbon tetrachloride containing an excess of iodine. The mixture was allowed to warm to room temperature with occasional shaking but did not change in appearance. The excess iodine was neutralized with aqueous sodium thiosulfate and the organic liquid was washed with water to remove all traces of inorganic solids. The chloroform and carbon tetrachloride was removed under vacuum and the dry residue was recrystallized from methanol to give a light brown crystalline compound having a melting point of 176°–177° C. and 70.9 percent iodine. This corresponds to the reported melting point for 1,4-di-iodomethylbenzene, namely 177°–178° C.

The remainder of the mother liquor containing 1,4-quinodimethane was stored at a temperature of −80° C. until it was desired to react it with an organic acid to form the aromatically unsaturated esters of the present invention.

1,4-quinodimethane is similarly prepared in acetone, hexane, toluene and any of the other liquids suitable for quenching of the pyrolyzed vapor and other quinodimethanes previously discussed such as, for example, 2-chloro-1,4-quinodimethane, 2-methyl-1,4-quinodimethane, 2,3-dichloro-1,4-quinodimethane, 1,4-naphthaquinodimethane, 5-chloro-1,2-quinodimethane, etc., may be similarly prepared without departing from the scope of this invention by pyrolyzing the corresponding xylene derivative under the conditions set forth above.

Example 2

Into a glass reaction flask containing 0.31 mole of trifluoroacetic acid in 250 ccs. of dichloromethane was gradually added, with agitation, 1.5 liters of hexane containing 0.13 mole of 1,4-quinodimethane at —80° C. and the contents of the flask was allowed to warm to room temperature over a period of 8 hours. The product formed was an easily saponifiable ester (B.P. 32 mm. 109–110° C.; density at 23° C. was 1.1837; N 22° was 1.4454; and M.P. was about 5° C.). The product, an amber colored oil, was separated by vacuum distillation and was obtained in 40 percent yield. Infrared analysis indicated the presence of C=O and phenyl groups. Mass spectrometric analysis indicated a mass peak that could be attributed of

The analytical values found for the ester are given below.

|  | Percent C | Percent H | Percent F | Molecular Weight |
|---|---|---|---|---|
| Calc. for $C_{10}H_9O_2F_3$ |  55.09 | 4.16 | 26.12 | 218 |
| Observed | { 55.2 | 4.32 | 26.3 | 206 |
|  | 55.4 | 4.18 |  |  |

Hydrolysis of the esters in warm dilute aqueous base led to the identification of p-tolylcarbinol as indicated below.

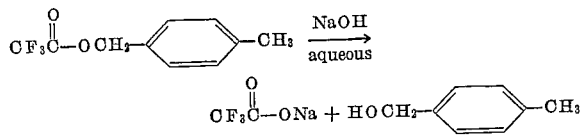

M.P.=55–57° C. from hexane

Lit. M.P.=59° C.

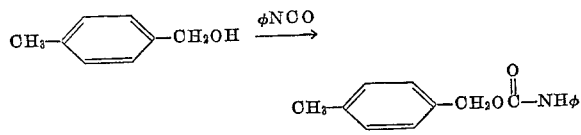

M.P.=76–77.5° C.

Lit. M.P.=79° C.

The ester obtained above it a valuable alkylating agent.

Example 3

Into a glass reaction flask containing 0.5 mole of thiobenzoic acid in 300 cc. hexane, 1.5 liters of hexane containing 0.1 mole of 1,4-quinodimethane is gradually added with stirring at —50° C. for a period of 10 hours after which the crude ester is filtered from solution, washed and dried. The xylyl ester

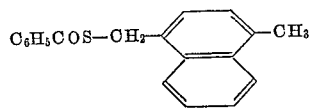

is obtained in about 50 percent yield and is useful as an alkylating agent.

Example 4

To a glass reaction flask containing 1.0 mole of dithioacetic acid in 500 cc. of chlorobenzene is gradually added with stirring 0.1 mole of 2-chloro-1,4-quinodimethane in 1.5 liters of chlorobenzene. The reaction is allowed to run at —40° C. for a period of 8 hours after which the crude ester is separated from the reaction mixture. The resulting xylyl ester

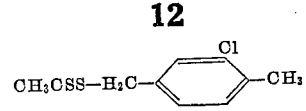

is obtained in about 40 percent yield and is useful as an insecticide or pesticide for destroying muscidae and culex larvae and the like. It is also valuable as a disinfectant.

Example 5

To a glass reaction flask containing 0.8 mole of o-nitrobenzoic acid in 300 ccs. carbon disulfide is gradually added with stirring 0.1 mole of 2-methyl-1,4-quinodimethane in 1.5 liters of carbon disulfide. The reaction is allowed to run at —90° C. for 10 hours after which the crude ester is filtered from the reaction mixture, washed and dried. The resulting xylylene ester

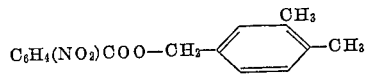

is obtained in about 50 percent yield. This ester may be condensed with polyhydric compounds to give valuable resins; the ester can be reduced to the amine which serves as an antioxidant oil additive.

Example 6

To a glass reaction flask containing 0.8 mole of 3,5,7,8-tetrachloroundecafluorooctanoic acid [1] in 300 cc. chlorobenzene is added with stirring 0.1 mole of 1,4-quinodimethane in 1.5 liters of chlorobenzene. The reaction is run at —70° C. for 10 hours after which the crude insoluble ester is filtered from solution, washed and dried. The resulting xylyl ester

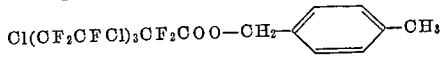

is obtained in about 50 percent yield.

Example 7

To a glass reaction flask containing 1.0 mole of 2,4,6-trichlorononafluorosuberic acid [1] in 500 cc. of hexane is added gradually with stirring, 0.1 mole of 1,4-quinodimethane in 1.5 liters of hexane. The reaction is run at —50° C. for six hours after which the product is filtered from solution, washed and dried. The resulting half ester

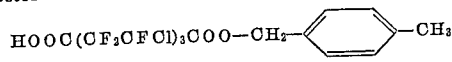

is obtained in 50 percent yield and is useful as an emulsifier and as a detergent. This ester is also useful as an alkylating agent.

Example 8

The ester product (0.3 mole) of the above Example #7 is reacted with 0.1 mole of 1,4-quinodimethane in 2 liters of hexane at —50° C. for 6 hours. The resulting diester

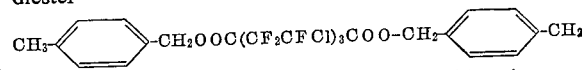

is separated from solution in 50 percent yield and serves as an inert solvent in many reactions.

Example 9

To a glass reaction flask containing 0.13 mole of 1,4-quinodimethane in 1.5 liters of hexane, is added with much stirring 0.35 mole of trifluoroacetic acid in 250 cc.

---

[1] See Examples 2 and 3 of the copending application of William S. Barnhart and Robert H. Wade, Serial No. 452,705, filed August 27, 1954, now U.S. Patent No. 2,806,866, wherein the above acids are prepared by treatment with fuming sulfuric acid of a sulfuryl chloride telomer of chlorotrifluoroethylene having the formula $Cl(CF_2CFCl)_nCl$ wherein $n$ is an integer from 3 to 16. The telomer, or any fraction thereof, is treated with fuming sulfuric acid containing from 0 to 20 percent excess sulfur trioxide at a temperature between about 140° C. and about 210° C. for a period of time ranging from 5 to 25 hours to produce perchlorofluorinated carboxylic acids.

of hexane. The reaction is run for 8 hours at −60° C. during which time the contents of the flask is allowed to warm to room temperature. The telomer product formed

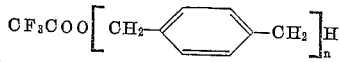

wherein $n$ is an integer between 2 and 10 is separated from solution, washed, dried and is obtained in about 40 percent yield. The lower molecular weight esters wherein $n$ is no greater than 3 serve as inert solvents whereas the higher molecular weight esters as chemically resistant coating materials which may be dispersed or dissolved in various volatile solvents such as for example acetone, toluene, etc.

Any of the other previously described organic acids may be reacted with a quinodimethane in a manner similar to that set forth above and may be substituted in any of the examples without departing from the scope of this invention.

The organic esters of this invention find application as lubricating oil additives, as alkylating agents in chemical reactions, and are also useful as solvents to provide an inert reaction medium.

The esters of this invention, particularly the polyhalogenated esters, are selectively soluble in certain volatile solvents, such as, for example, methyl ethyl ketone, chloroform, carbon tetrachloride, acetone, toluene, etc. This property enables the ester to be sprayed in a liquid carrier such as methyl ethyl ketone onto a substrate to provide a protective coating or film. Certain esters, such as for example, the thioesters, the dithioesters and esters containing a cyanide group are valuable as pesticides, and insecticides for destroying muscidae and culex larvae and the like. The thioesters and dithioesters can also be used as disinfectants and as plant sprays, for example, as a rose spray to prevent "black spot," etc.

The hydrocarbon esters can be condensed with polyhydric compounds to give valuable chemically resistant resins showing good electrical properties and resistant to abrasion. Half-esters of the present invention find special application as emulsifiers in polymerization reactions and as detergents owing to the presence of the carboxylic group which terminates the molecule. This is particularly true of the telomer half-ester.

This invention relates to a process for the preparation of organic aromatically unsaturated esters which involves the addition reaction of a chilled solution of 1,4-quinodimethane and an organic acid at temperatures preferably below about −40° C. and to the products thereby obtained. The method for effecting the addition reaction may be any of the various procedures hereindescribed, and various modifications and alternatives of these procedures may become apparent to those skilled in the art without departing from the scope of this invention.

Having thus described our invention we claim:

1. The process which comprises reacting an organic acid selected from the group consisting of a carboxylic acid, a thiocarboxylic acid and a carbodithioic acid with a para quinodimethane in the liquid phase at a temperature below 30° C.

2. The process of claim 1 wherein the organic acid is trifluoroacetic acid.

3. A process which comprises contacting in the liquid phase an organic acid selected from the group consisting of a carboxylic acid, a thiocarboxylic acid and a carbodithioic acid with a para quinodimethane in at least an equimolar amount at a temperature between about −120° C. and about 30° C. for a period not exceeding 96 hours to produce an ester containing aromatic unsaturation derived from said quinodimethane.

4. A process which comprises contacting in the liquid phase a carboxylic organic acid of $K>4\times10^{-5}$ with a para quinodimethane in a mole ratio of between about 2:1 and about 8:1, acid to quinodimethane, at a temperature between about −80° C. and about −40° C. for a period between about 0.5 and about 24 hours to produce an ester containing aromatic unsaturation derived from said quinodimethane.

5. The process which comprises reacting a carboxylic organic acid of $K>4\times10^{-5}$ with a para quinodimethane in a mole ratio of between about 2:1 and about 8:1, acid to quinodimethane, in a mutual solvent, at a temperature between about −80° C. and about −40° C. for a period between about 0.5 and about 24 hours to produce an ester containing aromatic unsaturation derived from said quinodimethane.

6. The process of claim 5 wherein the mutual solvent is hexane.

7. The process of claim 5 wherein the mutual solvent is chlorobenzene.

8. The process of claim 5 wherein the mutual solvent is carbon disulfide.

9. The process of claim 5 wherein the mutual solvent is methyl chloride.

10. The process of claim 5 wherein the mutual solvent is diethylbenzene.

11. The process which comprises reacting trifluoroacetic acid with 1,4-quinodimethane in a mole ratio of acid to quinodimethane of between about 2:1 and about 8:1, in a mixed solvent of dichloromethane and hexane, at a temperature between about −80° C. and about −40° C. for a period between about 0.5 and about 24 hours to produce 1,4-xylyl trifluoroacetate.

12. The process which comprises reacting an organic carboxylic acid with a 1,4-quinodimethane to produce an ester.

13. The process of claim 12 wherein the organic carboxylic acid in an α-nitrogen substituted carboxylic acid.

14. The process of claim 12 wherein the organic carboxylic acid is a dicarboxylic acid.

15. The process of claim 12 wherein the quinodimethane is 1,4-quinodimethane.

16. The process of claim 12 wherein the quinodimethane is 1,4-naphthaquinodimethane.

17. The process of claim 12 wherein the quinodimethane is 2-chloro-1,4-quinodimethane.

18. The process which comprises reacting a halogenated carboxylic acid with a 1,4-quinodimethane to produce an ester.

References Cited in the file of this patent

UNITED STATES PATENTS 2,378,447   Soday _____ June 19, 1945

OTHER REFERENCES

Heilbron: "Dictionary of Organic Compounds," vol. IV, page 529.
Beilstein: "Handbuch der Organischen Chemie," 4th edition, vol. 9, 1926, page 335.
Beilstein: "Handbuch der Organischen Chemie," 4th edition, vol. 9, 1926, page 414.
Mozingo et al.: J. Am. Chem. Soc. 70, 230 (1948).
Eliel et al.: J. Org. Chem. 49, 1696 (1954).
Wegand et al.: Chem. Abs. 49, 6112g (1955).
Leonard et al.: J. Am. Chem. Soc. 77, 5078–5083 (1955).